US007003455B1

(12) United States Patent
Deng et al.

(10) Patent No.: US 7,003,455 B1
(45) Date of Patent: Feb. 21, 2006

(54) METHOD OF NOISE REDUCTION USING CORRECTION AND SCALING VECTORS WITH PARTITIONING OF THE ACOUSTIC SPACE IN THE DOMAIN OF NOISY SPEECH

(75) Inventors: Li Deng, Redmond, WA (US); Xuedong Huang, Woodinville, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 822 days.

(21) Appl. No.: 09/688,764

(22) Filed: Oct. 16, 2000

(51) Int. Cl.
*G10L 15/20* (2006.01)

(52) U.S. Cl. .................................................... 704/233

(58) Field of Classification Search ................ 704/233, 704/226–228

See application file for complete search history.

(56) References Cited

U.S. PATENT DOCUMENTS 4,718,094 A * 1/1988 Bahl et al. .................. 704/256
5,012,519 A * 4/1991 Adlersberg et al. ......... 704/226
5,390,278 A * 2/1995 Gupta et al. ................ 704/243
5,583,968 A 12/1996 Trompf ..................... 395/2.41
5,590,242 A * 12/1996 Juang et al. ................ 704/245
5,604,839 A 2/1997 Acero et al.
5,758,022 A 5/1998 Trompf et al. ............. 395/2.41
5,924,065 A * 7/1999 Eberman et al. ............ 704/231
5,950,157 A 9/1999 Heck et al. ................. 704/234
6,026,359 A 2/2000 Yamaguchi et al. ........ 704/256
6,067,517 A 5/2000 Bahl et al. .................. 704/256
6,202,047 B1 * 3/2001 Ephraim et al. ............ 704/256
6,292,775 B1 * 9/2001 Holmes ...................... 704/209
6,301,561 B1 * 10/2001 Saul ........................... 704/256
6,401,064 B1 * 6/2002 Saul ........................... 704/240
6,446,038 B1 * 9/2002 Bayya et al. ............... 704/232
6,490,555 B1 * 12/2002 Yegnanarayanan et al. . 704/231
6,691,091 B1 2/2004 Cerisara et al. ............ 704/255

FOREIGN PATENT DOCUMENTS

EP 0 301 199 A1 2/1989 ........................ 5/6
EP 0 694 906 A1 1/1996 ........................ 5/6

OTHER PUBLICATIONS

Anastasakos, T., et al., "A Compact Model for Speaker-Adaptive Training," BBN Systems and Technologies, pp. 1137-1140, undated.

Boll, S. F., "Suppression of Acoustic Noise in Speech Using Spectral Subtraction," IEEE Transactions on Acoustics, Speech and Signal Processing, vol. ASSP-27, No. 2, pp. 113-120 (Apr. 1979) .

(Continued)

*Primary Examiner*—David L. Ometz
*Assistant Examiner*—Michael N. Opsasnick
(74) *Attorney, Agent, or Firm*—Theodore M. Magee; Westman, Champlin & Kelly, P.A.

(57) ABSTRACT

A method and apparatus are provided for reducing noise in a training signal and/or test signal. The noise reduction technique uses a stereo signal formed of two channel signals, each channel containing the same pattern signal. One of the channel signals is "clean" and the other includes additive noise. Using feature vectors from these channel signals, a collection of noise correction and scaling vectors is determined. When a feature vector of a noisy pattern signal is later received, it is multiplied by the best scaling vector for that feature vector and the best correction vector is added to the product to produce a noise reduced feature vector. Under one embodiment, the best scaling and correction vectors are identified by choosing an optimal mixture component for the noisy feature vector. The optimal mixture component being selected based on a distribution of noisy channel feature vectors associated with each mixture component.

25 Claims, 6 Drawing Sheets

OTHER PUBLICATIONS

Lockwood, P. et al., "Experiments With a Nonlinear Spectral Subtractor (NSS) , Hidden Markov Models and the Projection, for Robust Speech Recognition in Cars," Speech Communication 11, pp. 215-228 (1992) .
Boll, S.F., "A Spectral Subtraction Algorithm for Suppression of Acoustic Noise in Speech," IEEE International Conference on Acoustics, Speech & Signal Processing, pp. 200-203 (Apr. 2-4, 1979) .
Berouti, M. et al., "Enhancement of Speech Corrupted by Acoustic Noise," IEEE International Conference on Acoustics, Speech & Signal Processing, pp. 208-211 (Apr. 2-4, 1979) .
Acero, A., "Acoustical and Environmental Robustness in Automatic Speech Recognition," Department of Electrical and Computer Engineering, Carnegie Mellon University, pp. 1-141 (Sep. 13, 1990) .
Moreno, P., "Speech Recognition in Noisy Environments," Department of Electrical and Computer Engineering, Carnegie Mellon University, pp. 1-130 (Apr. 22, 1996) .
Ephraim, Yariv, "On the Application of Hidden Markov Models for Enhancing Noisy Speech," IEEE ICASSP vol 1, conf. 13, p. 533-536, 1988.
Moreno, Pedro J., "Multivariate-Gaussian-Based Cepstral Normalization for Robust Speech Recognition," Proceedings of ICASSP, p. 137-140, 1995.
U.S. Appl. No. 10/116,792, filed Apr. 5, 2002, Deng et al.
U.S. Appl. No. 10/117,142, filed Apr. 5, 2002, Droppo et al.
U.S. Appl. No. 09/688,950, filed Oct. 16, 2000, Deng et al.
"HMM Adaptation Using Vector Taylor Series for Noisy Speech Recognition," Alex Acero, et al., Proc. ICSLP, vol. 3, 2000, pp 869-872.
"Sequential Noise Estimation with Optimal Forgetting for Robust Speech Recognition," Mohomed Afify, et al., Proc. ICASSP, vol. 1, 2001, pp 229-232.
"High-Performance Robust Speech Recognition Using Stereo Training Data," Li Deng, et al., Proc. ICASSP, vol. 1, 2001, pp 301-304.
"Algonquin: Iterating Laplace's Method to Remove Multiple Types of Acoustic Distortion for Robust Speech Recognition," Brendan J. Frey, et al., Proc. Eurospeech, Sep. 2001, Aalborg, Denmark.
"Nonstationary Environment Compensation Based on Sequential Estimation," Nam Soo Kim, IEEE Signal Processing Letters, vol. 5, 1998, pp 57-60.
"On-line Estimation of Hidden Markov Model Parameters Based on the Kullback-Leibler Information Measure," Vikram Krishnamurthy, et al., IEEE Trans. Sig. Proc., vol. 41, 1993, pp 2257-2573.
"A Vector Taylor Series Approach for Environment-Independent Speech Recognition," Pedro J. Moreno, ICASSP, vol. 1, 1996, pp 733-736.
"Recursive Parameter Estimation Using Incomplete Data," D.M. Titterington, J. J. Royal Stat. Soc., vol. 46(B) , 1984, pp 257-267.
"The Aurora Experimental Framework for the Performance Evaluations of Speech Recognition Systems Under Noisy Conditions," David Pearce, et al., Proc. ISCA IIRW ASR 2000, Sep. 2000.
"Efficient On-Line Acoustic Environment Estimation for FCDCN in a Continuous Speech Recognition System," Jasha Droppo, et al., ICASSP, 2001.
"Robust Automatic Speech Recognition With Missing and Unreliable Acoustic Data," Martin Cooke, Speech Communication, vol. 34, No. 3, pp267-285, Jun. 2001.
"Learning Dynamic Noise Models From Noisy Speech for Robust Speech Recognition," Brendan J. Frey, et al., Neural Information Processing Systems Conference, 2001, pp 1165-1121.
"Speech Denoising and Dereverberation Using Probabilistic Models," Hagai Attias, et al., Advances in NIPS, vol. 13, 2000 pp 758-764.
"Statistical-Model-Based Speech Enhancement Systems," Proc. of IEEE, vol. 80, No. 10, Oct. 1992, pp 1526.
"HMM-Based Strategies for Enhancement of Speech Signals Embedded in Nonstationary Noise," Hossein Sameti, IEEE Trans. Speech Audio Processing, vol. 6, No. 5, Sep. 1998, pp 445-455.
"Model-based Compensation of the Additive Noise for Continuous Speech Recognition," J.C. Segura, et al., Eurospeech 2001.
"Large-Vocabulary Speech Recognition Under Adverse Acoustic Environments, " Li Deng, et al., Proc. ICSLP, vol. 3, 2000, pp 806-809.
"A New Method for Speech Denoising and Robust Speech Recognition Using Probabilistic Models for Clean Speech and for Noise," Hagai Attias, et al., Proc. Eurospeech, 2001, pp 1903-1906.
Neumeyer, L. and Weintraub, M. "Probabilistic Optimum Filtering For Robust Speech Recognition," Acoustics, Speech and Signal Processing, ICASSP-94, p. 417-420, Apr. 1994.

* cited by examiner

METHOD OF NOISE REDUCTION USING CORRECTION AND SCALING VECTORS WITH PARTITIONING OF THE ACOUSTIC SPACE IN THE DOMAIN OF NOISY SPEECH

BACKGROUND OF THE INVENTION

The present invention relates to noise reduction. In particular, the present invention relates to removing noise from signals used in pattern recognition.

A pattern recognition system, such as a speech recognition system, takes an input signal and attempts to decode the signal to find a pattern represented by the signal. For example, in a speech recognition system, a speech signal (often referred to as a test signal) is received by the recognition system and is decoded to identify a string of words represented by the speech signal.

To decode the incoming test signal, most recognition systems utilize one or more models that describe the likelihood that a portion of the test signal represents a particular pattern. Examples of such models include Neural Nets, Dynamic Time Warping, segment models, and Hidden Markov Models.

Before a model can be used to decode an incoming signal, it must be trained. This is typically done by measuring input training signals generated from a known training pattern. For example, in speech recognition, a collection of speech signals is generated by speakers reading from a known text. These speech signals are then used to train the models.

In order for the models to work optimally, the signals used to train the model should be similar to the eventual test signals that are decoded. In particular, the training signals should have the same amount and type of noise as the test signals that are decoded.

Typically, the training signal is collected under "clean" conditions and is considered to be relatively noise free. To achieve this same low level of noise in the test signal, many prior art systems apply noise reduction techniques to the testing data. In particular, many prior art speech recognition systems use a noise reduction technique known as spectral subtraction.

In spectral subtraction, noise samples are collected from the speech signal during pauses in the speech. The spectral content of these samples is then subtracted from the spectral representation of the speech signal. The difference in the spectral values represents the noise-reduced speech signal.

Because spectral subtraction estimates the noise from samples taken during a limited part of the speech signal, it does not completely remove the noise if the noise is changing over time. For example, spectral subtraction is unable to remove sudden bursts of noise such as a door shutting or a car driving past the speaker.

In another technique for removing noise, the prior art identifies a set of correction vectors from a stereo signal formed of two channel signals, each channel containing the same pattern signal. One of the channel signals is "clean" and the other includes additive noise. Using feature vectors that represent frames of these channel signals, a collection of noise correction vectors are determined by subtracting feature vectors of the noisy channel signal from feature vectors of the clean channel signal. When a feature vector of a noisy pattern signal, either a training signal or a test signal, is later received, a suitable correction vector is added to the feature vector to produce a noise reduced feature vector.

Under the prior art, each correction vector is associated with a mixture component. To form the mixture component, the prior art divides the feature vector space defined by the clean channel's feature vectors into a number of different mixture components. When a feature vector for a noisy pattern signal is later received, it is compared to the distribution of clean channel feature vectors in each mixture component to identify a mixture component that best suits the feature vector. However, because the clean channel feature vectors do not include noise, the shapes of the distributions generated under the prior art are not ideal for finding a mixture component that best suits a feature vector from a noisy pattern signal.

In addition, the correction vectors of the prior art only provided an additive element for removing noise from a pattern signal. As such, these prior art systems are less than ideal at removing noise that is scaled to the noisy pattern signal itself.

In light of this, a noise reduction technique is needed that is more effective at removing noise from pattern signals.

SUMMARY OF THE INVENTION

A method and apparatus are provided for reducing noise in a training signal and/or test signal used in a pattern recognition system. The noise reduction technique uses a stereo signal formed of two channel signals, each channel containing the same pattern signal. One of the channel signals is "clean" and the other includes additive noise. Using feature vectors from these channel signals, a collection of noise correction and scaling vectors is determined. When a feature vector of a noisy pattern signal is later received, it is multiplied by the best scaling vector for that feature vector and the product is added to the best correction vector to produce a noise reduced feature vector. Under one embodiment, the best scaling and correction vectors are identified by choosing an optimal mixture component for the noisy feature vector. The optimal mixture component being selected based on a distribution of noisy channel feature vectors associated with each mixture component.

DETAILED DESCRIPTION OF ILLUSTRATIVE EMBODIMENTS

Figure 1:
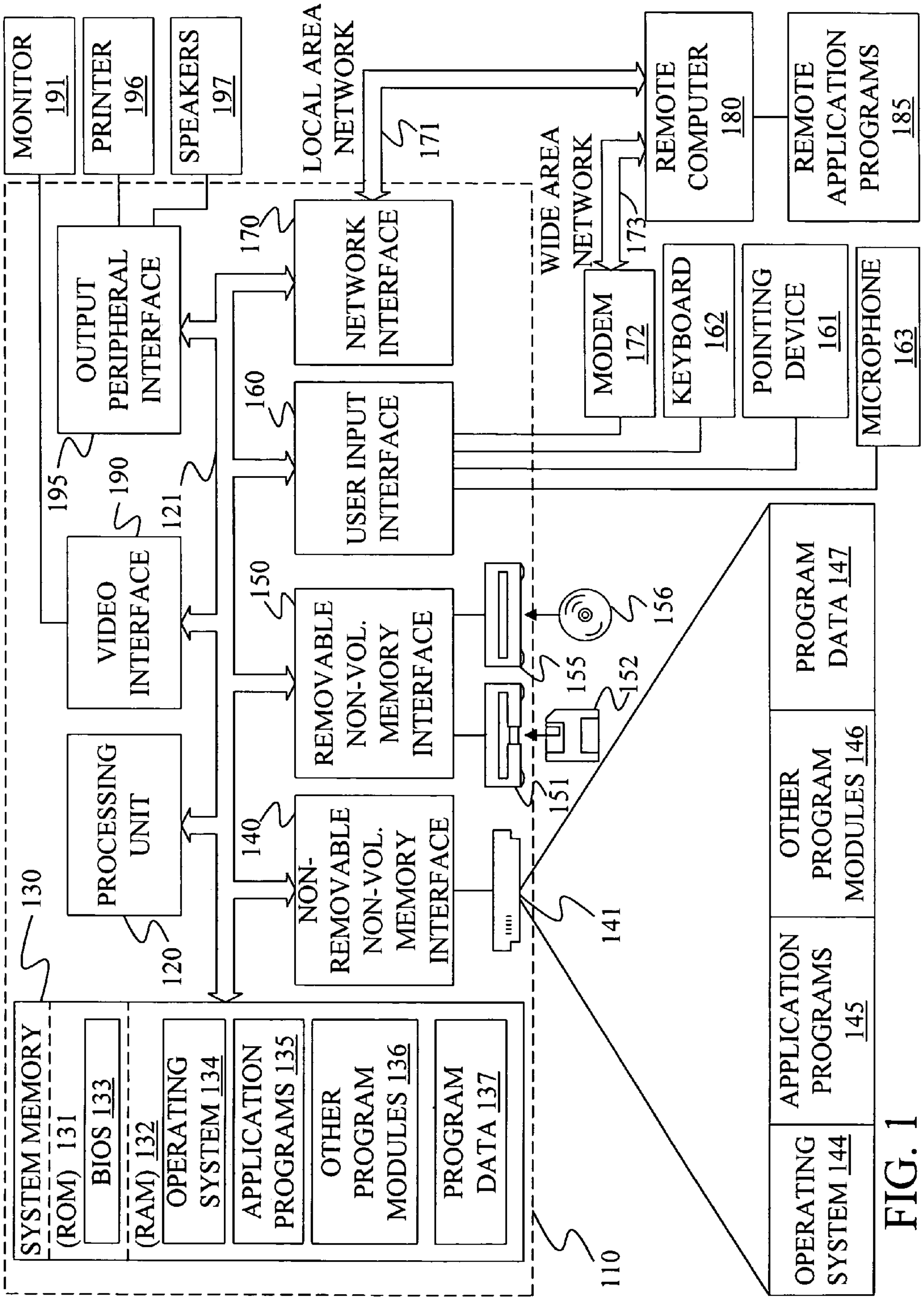
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
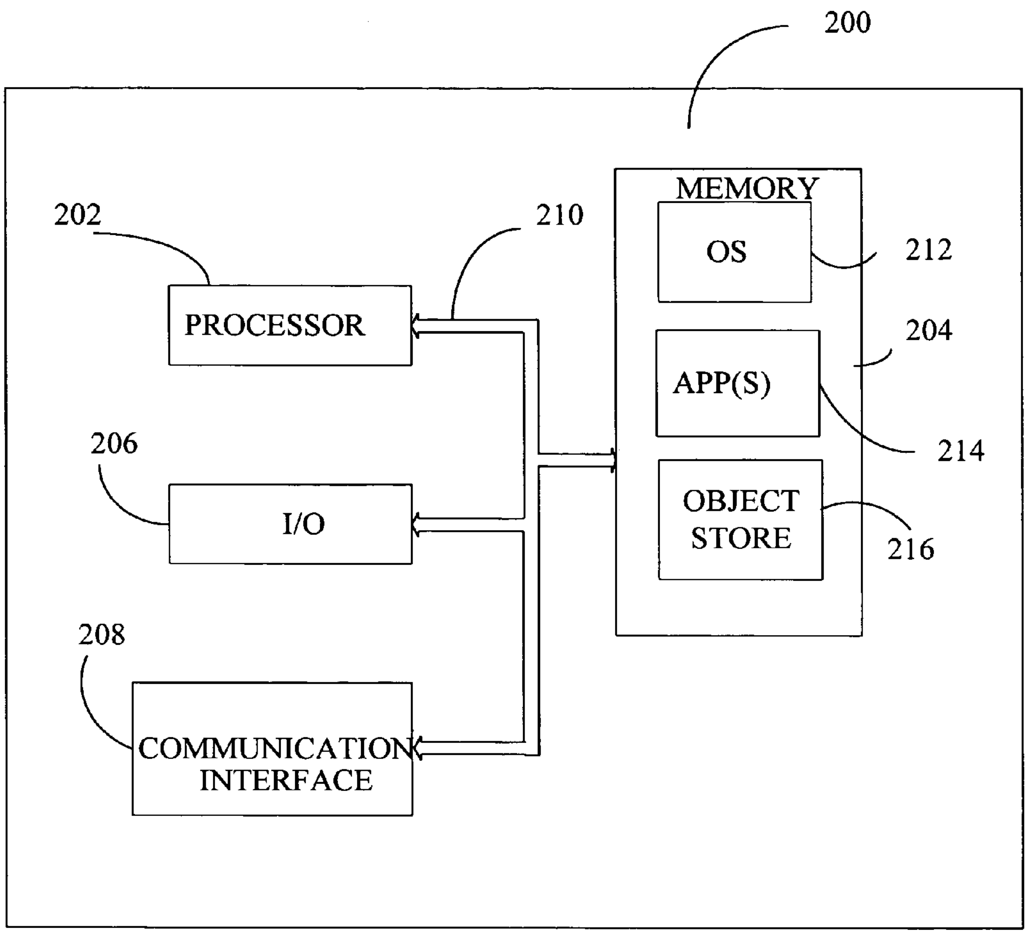
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Under the present invention, a system and method are provided that reduce noise in pattern recognition signals. To do this, the present invention identifies a collection of scaling vectors, $S_k$, and correction vectors, $r_k$, that can be respectively multiplied by and added to a feature vector representing a portion of a noisy pattern signal to produce a feature vector representing a portion of a "clean" pattern signal. A method for identifying the collection of scaling vectors and correction vectors is described below with reference to the flow diagram of FIG. 3 and the block diagram of FIG. 4. A method of applying scaling vectors and correction vectors to noisy feature vectors is described below with reference to the flow diagram of FIG. 5 and the block diagram of FIG. 6.

Figure 3:
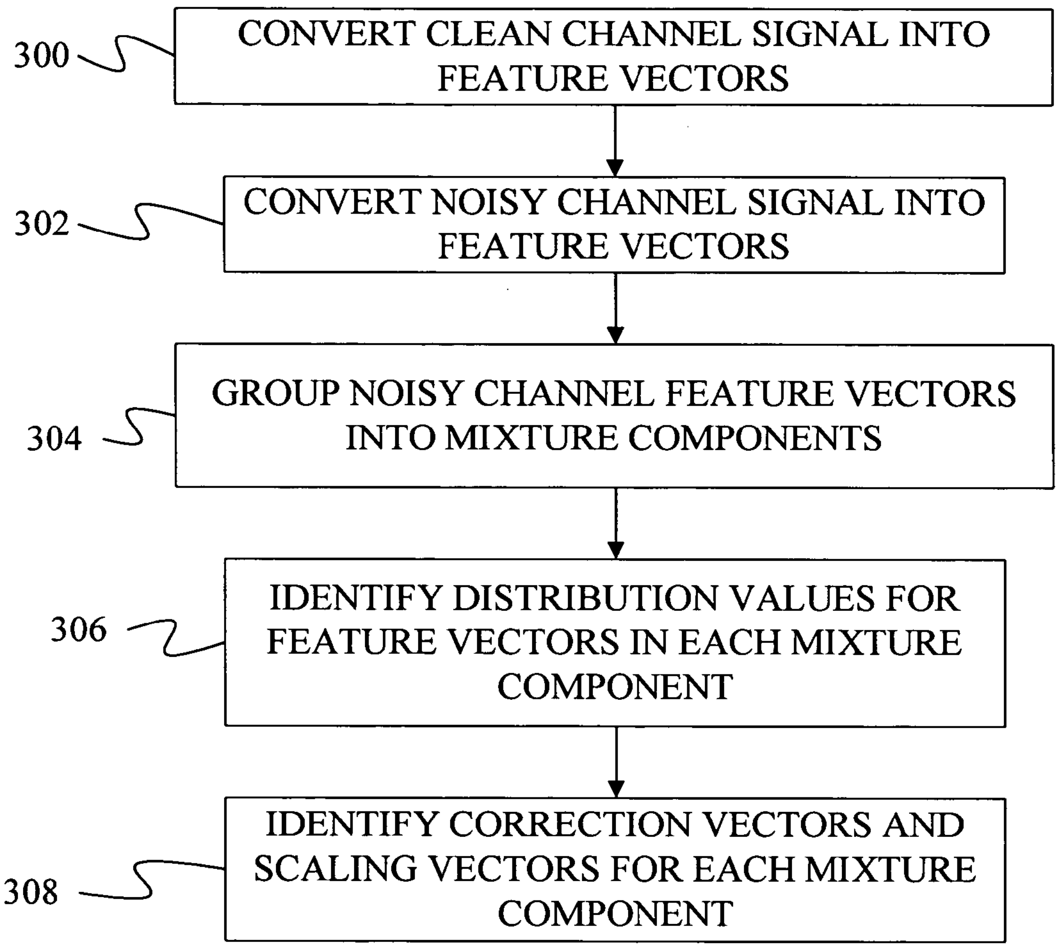
FIG. 3 is a flow diagram of a method of training a noise reduction system of the present invention.

The method of identifying scaling vectors and correction vectors begins in step 300 of FIG. 3, where a "clean" channel signal is converted into a sequence of feature vectors. To do this, a speaker 400 of FIG. 4, speaks into a microphone 402, which converts the audio waves into electrical signals. The electrical signals are then sampled by an analog-to-digital converter 404 to generate a sequence of digital values, which are grouped into frames of values by a frame constructor 406. In one embodiment, A-to-D converter 404 samples the analog signal at 16 kHz and 16 bits per sample, thereby creating 32 kilobytes of speech data per second and frame constructor 406 creates a new frame every 10 milliseconds that includes 25 milliseconds worth of data.

Each frame of data provided by frame constructor 406 is converted into a feature vector by a feature extractor 408. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

In step 302 of FIG. 3, a noisy channel signal is converted into feature vectors. Although the conversion of step 302 is shown as occurring after the conversion of step 300, any part of the conversion may be performed before, during or after step 300 under the present invention. The conversion of step 302 is performed through a process similar to that described above for step 300.

Figure 4:
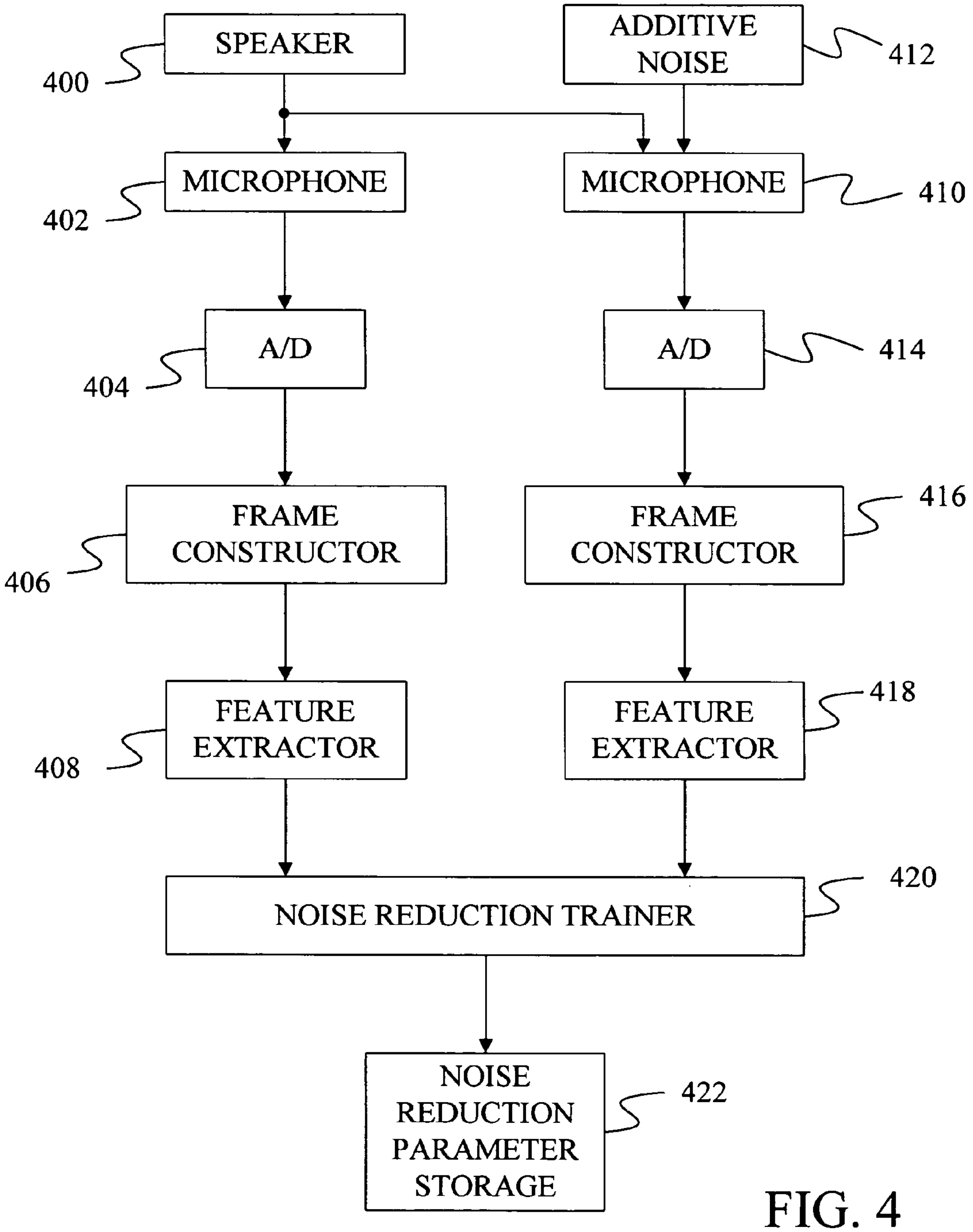
FIG. 4 is a block diagram of components used in one embodiment of the present invention to train a noise reduction system.

In the embodiment of FIG. 4, this process begins when the same speech signal generated by speaker 400 is provided to a second microphone 410. This second microphone also receives an additive noise signal from an additive noise source 412. Microphone 410 converts the speech and noise signals into a single electrical signal, which is sampled by an analog-to-digital converter 414. The sampling characteristics for A/D converter 414 are the same as those described above for A/D converter 404. The samples provided by A/D converter 414 are collected into frames by a frame constructor 416, which acts in a manner similar to frame constructor 406. These frames of samples are then converted into feature vectors by a feature extractor 418, which uses the same feature extraction method as feature extractor 408.

In other embodiments, microphone 410, A/D converter 414, frame constructor 416 and feature extractor 418 are not present. Instead, the additive noise is added to a stored version of the speech signal at some point within the processing chain formed by microphone 402, A/D converter 404, frame constructor 406, and feature extractor 408. For example, the analog version of the "clean" channel signal may be stored after it is created by microphone 402. The original "clean" channel signal is then applied to A/D converter 404, frame constructor 406, and feature extractor 408. When that process is complete, an analog noise signal is added to the stored "clean" channel signal to form a noisy analog channel signal. This noisy signal is then applied to A/D converter 404, frame constructor 406, and feature extractor 408 to form the feature vectors for the noisy channel signal.

In other embodiments, digital samples of noise are added to stored digital samples of the "clean" channel signal between A/D converter 404 and frame constructor 406, or frames of digital noise samples are added to stored frames of "clean" channel samples after frame constructor 406. In still further embodiments, the frames of "clean" channel samples are converted into the frequency domain and the spectral content of additive noise is added to the frequency-domain representation of the "clean" channel signal. This produces a frequency-domain representation of a noisy channel signal that can be used for feature extraction.

The feature vectors for the noisy channel signal and the "clean" channel signal are provided to a noise reduction trainer 420 in FIG. 4. At step 304 of FIG. 3, noise reduction trainer 420 groups the feature vectors for the noisy channel signal into mixture components. This grouping can be done by grouping feature vectors of similar noises together using a maximum likelihood training technique or by grouping feature vectors that represent a temporal section of the speech signal together. Those skilled in the art will recognize that other techniques for grouping the feature vectors may be used and that the two techniques listed above are only provided as examples.

After the feature vectors of the noisy channel signal have been grouped into mixture components, noise reduction trainer 420 generates a set of distribution values that are indicative of the distribution of the feature vectors within the mixture component. This is shown as step 306 in FIG. 3. In many embodiments, this involves determining a mean vector and a standard deviation vector for each vector component in the feature vectors of each mixture component. In an embodiment in which maximum likelihood training is used to group the feature vectors, the means and standard deviations are provided as by-products of identifying the groups for the mixture components.

Once the means and standard deviations have been determined for each mixture component, the noise reduction trainer 420 determines a correction vector, $r_k$, and a scaling vector Sk, for each mixture component, k, at step 308 of FIG. 3. Under one embodiment, the vector components of the scaling vector and the vector components of the correction vector for each mixture component are determined using a weighted least squares estimation technique. Under this technique, the scaling vector components are calculated as:

EQ. 1

$$S_{i,k} = \frac{\left[\sum_{t=0}^{T-1} p(k \mid y_{i,t}) y_{i,t}\right]\left[\sum_{t=0}^{T-1} p(k \mid y_{i,t}) x_{i,t}\right] - \left[\sum_{t=0}^{T-1} p(k \mid y_{i,t})\right]\left[\sum_{t=0}^{T-1} p(k \mid y_{i,t}) x_{i,t} y_{i,t}\right]}{\left[\sum_{t=0}^{T-1} p(k \mid y_{i,t}) y_{i,t}\right]^2 - \left[\sum_{t=0}^{T-1} p(k \mid y_{i,t})\right]\left[\sum_{t=0}^{T-1} p(k \mid y_{i,t}) y_{i,t}^2\right]}$$

and the correction vector components are calculated as:

EQ. 2

$$r_{i,k} = \frac{\left[\sum_{t=0}^{T-1} p(k \mid y_{i,t}) y_{i,t}\right]\left[\sum_{t=0}^{T-1} p(k \mid y_{i,t}) x_{i,t} y_{i,t}\right] - \left[\sum_{t=0}^{T-1} p(k \mid y_{i,t}) x_{i,t}\right]\left[\sum_{t=0}^{T-1} p(k \mid y_{i,t}) y_{i,t}^2\right]}{\left[\sum_{t=0}^{T-1} p(k \mid y_{i,t}) y_{i,t}\right]^2 - \left[\sum_{t=0}^{T-1} p(k \mid y_{i,t})\right]\left[\sum_{t=0}^{T-1} p(k \mid y_{i,t}) y_{i,t}^2\right]}$$

Where $S_{i,k}$ is the $i^{th}$ vector component of a scaling vector, $S_k$, for mixture component k, $r_{i,k}$ is the $i^{th}$ vector component of a correction vector, $r_k$, for mixture component k, $Y_{i,t}$ is the $i^{th}$ vector component for the feature vector in the $t^{th}$ frame of the noisy channel signal, $x_{i,t}$ is the $i^{th}$ vector component for the feature vector in the $t^{th}$ frame of the "clean" channel signal, T is the total number of frames in the "clean" and noisy channel signals, and $p(k|y_{i,t})$ is the probability of the $k^{th}$ mixture component given the feature vector component for the $t^{th}$ frame of the noisy channel signal.

In equations 1 and 2, the $p(k|y_{i,t})$ term provides a weighting function that indicates the relative relationship between the $k^{th}$ mixture component and the current frame of the channel signals.

The $p(k|y_{i,t})$ term can be calculated using Bayes' theorem as:

$$p(k \mid y_{i,t}) = \frac{p(y_{i,t} \mid k) p(k)}{\sum_{\text{all } k} p(y_{i,t} \mid k) p(k)} \qquad \text{EQ. 3}$$

Where $p(y_{i,t}|k)$ is the probability of the $i^{th}$ vector component in the noisy feature vector given the $k^{th}$ mixture component, and p(k) is the probability of the $k^{th}$ mixture component.

The probability of the $i^{th}$ vector component in the noisy feature vector given the $k^{th}$ mixture component, $p(y_{i,t}|k)$, can be determined using a normal distribution based on the distribution values determined for the $k^{th}$ mixture component in step 306 of FIG. 3. In one embodiment, the probability of the $k^{th}$ mixture component, p(k), is simply the inverse of the number of mixture components. For example, in an embodiment that has 256 mixture components, the probability of any one mixture component is 1/256.

After a correction vector and a scaling vector have been determined for each mixture component at step 308, the process of training the noise reduction system of the present invention is complete. The correction vectors, scaling vectors, and distribution values for each mixture component are then stored in a noise reduction parameter storage 422 of FIG. 4.

Once the correction vector and scaling vector have been determined for each mixture, the vectors may be used in a noise reduction technique of the present invention. In particular, the correction vectors and scaling vectors may be used to remove noise in a training signal and/or test signal used in pattern recognition.

Figure 5:
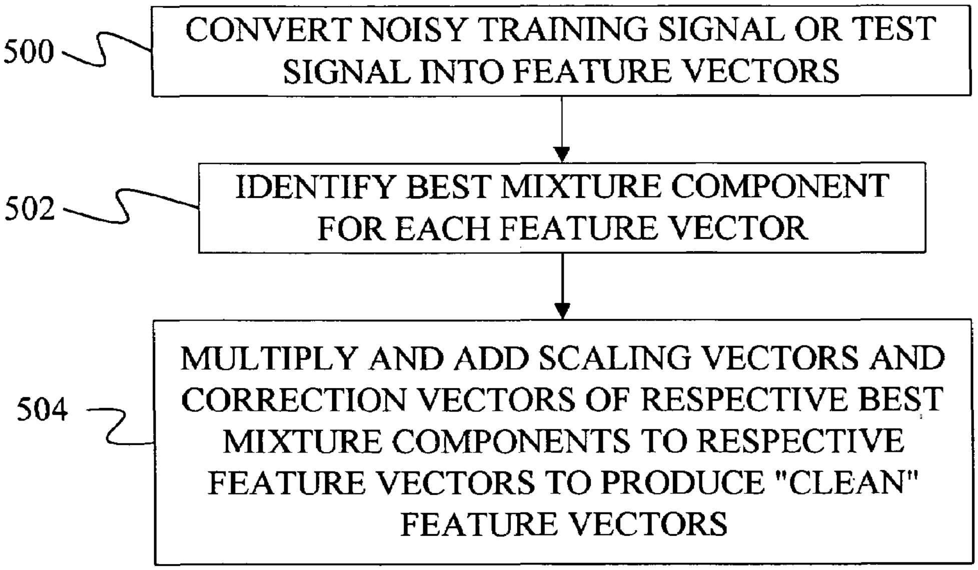
FIG. 5 is a flow diagram of one embodiment of a method of using a noise reduction system of the present invention.

FIG. 5 provides a flow diagram that describes the technique for reducing noise in a training signal and/or test signal. The process of FIG. 5 begins at step 500 where a noisy training signal or test signal is converted into a series of feature vectors. The noise reduction technique then determines which mixture component best matches each noisy feature vector. This is done by applying the noisy feature vector to a distribution of noisy channel feature vectors associated with each mixture component. In one embodiment, this distribution is a collection of normal distributions defined by the mixture component's mean and standard deviation vectors. The mixture component that provides the highest probability for the noisy feature vector is then selected as the best match for the feature vector. This selection is represented in an equation as:

$$\hat{k}=arg_k \max c_k N(y;\mu_k,\Sigma_k) \qquad \text{EQ. 4}$$

Where $\hat{k}$ is the best matching mixture component, $c_k$ is a weight factor for the $k^{th}$ mixture component, $N(y;\mu_k,\Sigma_k)$ is the value for the individual noisy feature vector, y, from the normal distribution generated for the mean vector, $\mu_k$, and the standard deviation vector, $\Sigma_k$, of the $k^{th}$ mixture component. In most embodiments, each mixture component is given an equal weight factor $C_k$.

Note that under the present invention, the mean vector and standard deviation vector for each mixture component is determined from noisy channel vectors and not "clean" channel vectors as was done in the prior art. Because of this, the normal distributions based on these means and standard deviations are better shaped for finding a best mixture component for a noisy pattern vector.

Once the best mixture component for each input feature vector has been identified at step 502, the corresponding scaling and correction vectors for those mixture components are (element by element) multiplied by and added to the individual feature vectors to form "clean" feature vectors. In terms of an equation:

$$x_i=S_{i,k}y_i+r_{i,k} \qquad \text{EQ. 5}$$

Where $x_i$ is the $i^{th}$ vector component of an individual "clean" feature vector, $y_i$ is the $i^{th}$ vector component of an individual noisy feature vector from the input signal, and $S_{i,k}$ and $r_{i,k}$ are the $i^{th}$ vector component of the scaling and correction vectors, respectively, both optimally selected for the individual noisy feature vector. The operation of Equation 5 is repeated for each vector component. Thus, Equation 5 can be re-written in vector notation as:

$$x=S_k y+r_k \qquad \text{EQ. 5}$$

where x is the "clean" feature vector, $S_k$ is the scaling vector, y is the noisy feature vector, and $r_k$ is the correction vector.

Figure 6:
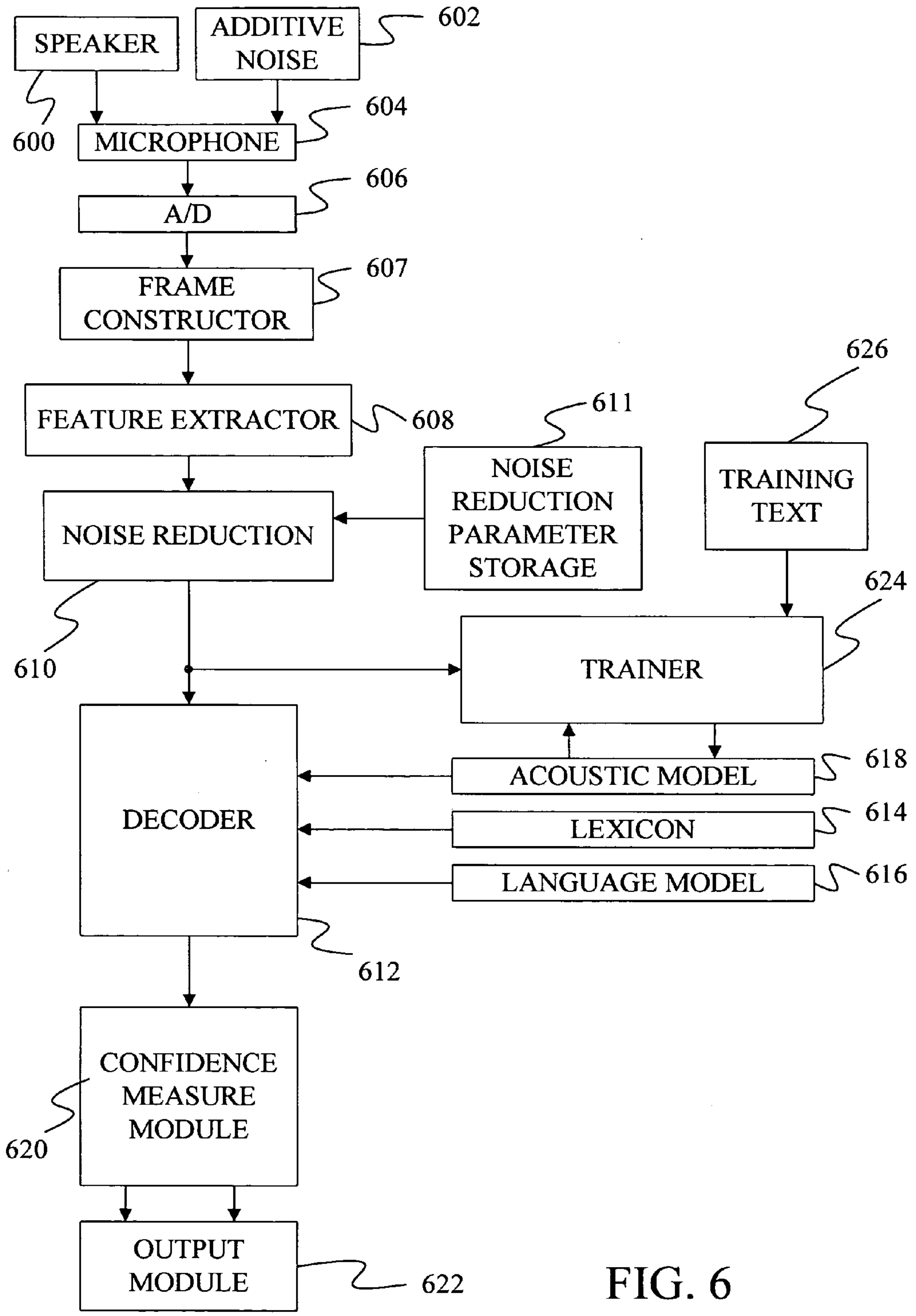
FIG. 6 is a block diagram of a pattern recognition system in which the present invention may be used.

FIG. 6 provides a block diagram of an environment in which the noise reduction technique of the present invention may be utilized. In particular, FIG. 6 shows a speech recognition system in which the noise reduction technique of the present invention is used to reduce noise in a training signal used to train an acoustic model and/or to reduce noise in a test signal that is applied against an acoustic model to identify the linguistic content of the test signal.

In FIG. 6, a speaker 600, either a trainer or a user, speaks into a microphone 604. Microphone 604 also receives additive noise from one or more noise sources 602. The audio signals detected by microphone 604 are converted into electrical signals that are provided to analog-to-digital converter 606. Although additive noise 602 is shown entering through microphone 604 in the embodiment of FIG. 6, in other embodiments, additive noise 602 may be added to the input speech signal as a digital signal after A-to-D converter 606.

A-to-D converter 606 converts the analog signal from microphone 604 into a series of digital values. In several embodiments, A-to-D converter 606 samples the analog signal at 16 kHz and 16 bits per sample, thereby creating 32 kilobytes of speech data per second. These digital values are provided to a frame constructor 607, which, in one embodiment, groups the values into 25 millisecond frames that start 10 milliseconds apart.

The frames of data created by frame constructor 607 are provided to feature extractor 610, which extracts a feature from each frame. The same feature extraction that was used to train the noise reduction parameters (the scaling vectors, correction vectors, means, and standard deviations of the mixture components) is used in feature extractor 610. As mentioned above, examples of such feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction.

The feature extraction module produces a stream of feature vectors that are each associated with a frame of the speech signal. This stream of feature vectors is provided to noise reduction module 610 of the present invention, which uses the noise reduction parameters stored in noise reduction parameter storage 611 to reduce the noise in the input speech signal. In particular, as shown in FIG. 5, noise reduction module 610 selects a single mixture component for each input feature vector and then multiplies the input feature vector by that mixture component's scaling vector and adding that mixture component's correction vector to the product to produce a "clean" feature vector.

Thus, the output of noise reduction module 610 is a series of "clean" feature vectors. If the input signal is a training signal, this series of "clean" feature vectors is provided to a trainer 624, which uses the "clean" feature vectors and a training text 626 to train an acoustic model 618. Techniques for training such models are known in the art and a description of them is not required for an understanding of the present invention.

If the input signal is a test signal, the "clean" feature vectors are provided to a decoder 612, which identifies a most likely sequence of words based on the stream of feature vectors, a lexicon 614, a language model 616, and the acoustic model 618. The particular method used for decoding is not important to the present invention and any of several known methods for decoding may be used.

The most probable sequence of hypothesis words is provided to a confidence measure module 620. Confidence measure module 620 identifies which words are most likely to have been improperly identified by the speech recognizer, based in part on a secondary acoustic model (not shown). Confidence measure module 620 then provides the sequence of hypothesis words to an output module 622 along with identifiers indicating which words may have been improperly identified. Those skilled in the art will recognize that confidence measure module 620 is not necessary for the practice of the present invention.

Although FIG. 6 depicts a speech recognition system, the present invention may be used in any pattern recognition system and is not limited to speech.

Although the present invention has been described with reference to particular embodiments, workers skilled in the art will recognize that changes may be made in form and detail without departing from the spirit and scope of the invention.

What is claimed is:

1. A method of noise reduction for reducing noise in a noisy input signal, the method comprising:

grouping noisy channel feature vectors and clean channel feature vectors into a plurality of mixture components;

fitting a function applied to noisy channel feature vectors associated with a mixture component to only those clean channel feature vectors that are associated with the same mixture component to determine at least one correction vector and at least one scaling vector by generating a set of correction and scaling vectors, each correction vector and scaling vector corresponding to a separate mixture component of noisy channel feature vectors;

multiplying the scaling vector by a noisy input feature vector to produce a scaled feature vector; and adding a correction vector to the scaled feature vector to form a clean input feature vector.

2. The method of claim 1 wherein determining a correction vector comprises:

grouping the noisy channel feature vectors into at least one mixture component;

determining a distribution value that is indicative of the distribution of the noisy channel feature vectors in at least one mixture component; and using the distribution value for a mixture component to determine the correction vector and the scaling vector for that mixture component.

3. The method of claim 2 wherein using the distribution value to determine a correction vector and a scaling vector for a mixture component comprises:

determining, for each noisy channel feature vector, at least one conditional mixture probability, the conditional mixture probability representing the probability of the mixture component given the noisy channel feature vector, the conditional mixture probability based in part on a distribution value for the mixture component; and applying the conditional mixture probability in a linear least squares calculation.

4. The method of claim 3 wherein determining a conditional mixture probability comprises:

determining a conditional feature vector probability that represents the probability of a noisy channel feature vector given the mixture component, the probability based on the distribution value for the mixture;

multiplying the conditional feature vector probability by the unconditional probability of the mixture component to produce a probability product; and dividing the probability product by the sum of the probability products generated for all mixture components for the noisy channel feature vector.

5. The method of claim 4 wherein determining a conditional feature vector probability comprises determining the probability from a normal distribution formed from the distribution value for a mixture component.

6. The method of claim 5 wherein determining a distribution value comprises determining a mean vector and determining a standard deviation vector.

7. The method of claim 1 wherein multiplying the scaling vector by a noisy input feature vector comprises:

identifying a mixture component for the noisy input feature vector; and multiplying the noisy input feature vector by a scaling vector associated with the mixture component.

8. The method of claim 7 wherein adding a correction vector comprises adding a correction vector associated with the mixture component to the scaled feature vector.

9. The method of claim 8 wherein identifying a mixture component comprises identifying the most likely mixture component for the noisy input feature vector.

10. The method of claim 9 wherein identifying the most likely mixture component comprises:

grouping the noisy channel feature vectors into at least one mixture component;

determining a distribution value that is indicative of the distribution of the noisy channel feature vectors in at least one mixture component;

for each mixture component, determining a probability of the noisy input feature vector given the mixture component based on a normal distribution formed from the distribution value for that mixture component; and selecting the mixture component that provides the highest probability as the most likely mixture component.

11. A method of reducing noise in a noisy signal, the method comprising:

identifying a single mixture component for a noisy feature vector representing a part of the noisy signal by selecting a most likely mixture component through steps comprising:

for each mixture component, determining a probability of the noisy feature vector given the mixture component; and selecting the mixture component that provides the highest probability as the most likely mixture component;

retrieving a correction vector and a scaling vector associated with the identified mixture component;

multiplying the noisy feature vector by the scaling vector to form a scaled feature vector; and adding the correction vector to the scaled feature vector to form a clean feature vector representing a part of a clean signal.

12. The method of claim 11 wherein determining a probability comprises determining a probability based on a distribution of noisy channel feature vectors that are assigned to the mixture component.

13. The method of claim 12 wherein determining a probability based on a distribution comprises determining a probability based on a mean and a standard deviation of the distribution.

14. A method of reducing noise in a noisy signal, the method comprising:

identifying a single mixture component for a noisy feature vector representing a part of the noisy signal;

retrieving a correction vector and a scaling vector associated with the identified mixture component, the correction vector and the scaling vector being formed through fitting a function evaluated on a sequence of noisy channel feature vectors to a sequence of clean channel feature vectors;

multiplying the noisy feature vector by the scaling vector to form a scaled feature vector; and adding the correction vector to the scaled feature vector to form a clean feature vector representing a part of a clean signal.

15. The method of claim 14 wherein fitting the function comprises performing a linear least squares calculation.

16. The method of claim 15 wherein performing a linear least squares calculation comprises utilizing a weight value in the linear least squares calculation, the weight value providing an indication of association between a noisy channel feature vector and a mixture component.

17. The method of claim 16 wherein utilizing a weight value comprises:

determining a conditional probability of a mixture component given a noisy channel feature vector; and using the conditional probability as the weight value.

18. The method of claim 17 wherein determining a conditional probability comprises:

for each mixture component, determining a probability of the mixture component and determining a feature probability that represents the probability of the noisy channel feature vector given the mixture component;

for each mixture component, multiplying the probability of the mixture component by the respective feature probability for the mixture component to provide a respective probability product;

summing the probability products of the noisy feature vector for all mixture components to produce a probability sum;

multiplying the probability of the mixture component associated with the correction vector and the scaling vector by the probability of the noisy feature vector given the mixture component associated with the correction vector and the scaling vector to produce a second probability product; and dividing the second probability product by the probability sum.

19. A computer-readable medium comprising computer-executable instructions for reducing noise in a signal through steps comprising:

using a representation value that represents a portion of the signal to identify an optimal mixture component for that portion;

selecting a correction value and a scaling value associated with the identified optimal mixture component; and multiplying the scaling value by the representation value to form a product; and adding the product to the correction value to form a noise-reduced value that represents a portion of a noise-reduced signal.

20. The computer-readable medium of claim 19 wherein the step of using a representation value to identify an optimal mixture component comprises:

for each mixture component, applying the representation value to a distribution of representation values associated with the mixture component to generate a likelihood of the representation value given the mixture component; and selecting the mixture component that generates the greatest likelihood as the optimal mixture component.

21. A method of generating correction values for removing noise from an input signal, the method comprising:

accessing a set of noisy channel vectors representing a noisy channel signal;

accessing a set of clean channel vectors representing a clean channel signal;

grouping the noisy channel vectors and the clean channel vectors into a plurality of mixture components; and determining a correction value for a mixture component without reference to clean channel vectors that are not associated with the mixture component by performing a linear least squares calculation to fit a function based on noisy channel vectors to clean channel vectors, the linear least squares calculation comprising:

determining a distribution parameter for each mixture component, the distribution parameter describing the distribution of noisy channel vectors associated with the respective mixture component;

using the distribution parameter to form a weight value; and utilizing the weight value in the linear least squares calculation.

22. The method of claim 21 wherein using the distribution parameter to form a weight value comprises using the distribution parameter to determine a probability of a mixture component given a noisy channel vector.

23. The method of claim 21 wherein determining a correction value comprises determining an additive correction value and a scaling correction value.

24. A method of generating correction values for removing noise from an input signal, the method comprising:

accessing a set of noisy channel vectors representing a noisy channel signal;

accessing a set of clean channel vectors representing a clean channel signal;

grouping the noisy channel vectors and the clean channel vectors into a plurality of mixture components wherein grouping the noisy channel vectors comprises determining a distribution parameter for each mixture component, the distribution parameter describing the distribution of noisy channel vectors associated with the respective mixture component; and determining a correction value for a mixture component without reference to clean channel vectors that are not associated with the mixture component wherein determining a correction value comprises determining a correction value based in part on the distribution parameters.

25. A method of generating correction values for removing noise from an input signal, the method comprising:

accessing a set of noisy channel vectors representing a noisy channel signal;

accessing a set of clean channel vectors representing a clean channel signal;

grouping the noisy channel vectors and the clean channel vectors into a plurality of mixture components;

determining a correction value for a mixture component without reference to clean channel vectors that are not associated with the mixture component; and using the correction values to remove noise from an input signal through a process comprising:

converting the input signal into input vectors;

finding a best suited mixture component for each input vector; and for each input vector, applying to the input vector a correction value associated with the mixture component best suited for the input vector.

* * * * *